United States Patent
Sano et al.

(10) Patent No.: US 10,735,832 B2
(45) Date of Patent: Aug. 4, 2020

(54) METHOD, APPARATUS, AND SYSTEM FOR DATA COLLECTION

(71) Applicant: FUJITSU LIMITED, Kawasaki-shi, Kanagawa (JP)

(72) Inventors: Satoshi Sano, Kawasaki (JP); Takushi Fujita, Chigasaki (JP); Asako Kitaura, Kawasaki (JP); Eishi Morimatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/391,223

(22) Filed: Apr. 22, 2019

(65) Prior Publication Data

US 2019/0349651 A1 Nov. 14, 2019

(30) Foreign Application Priority Data

May 10, 2018 (JP) ................. 2018-091664

(51) Int. Cl.
*H04Q 9/00* (2006.01)
*H04W 4/44* (2018.01)

(52) U.S. Cl.
CPC ........... *H04Q 9/00* (2013.01); *H04Q 2209/40* (2013.01); *H04W 4/44* (2018.02)

(58) Field of Classification Search
CPC ....... H04Q 9/00; H04Q 2209/40; H04W 4/44; H04W 4/027; H04W 4/029; H04W 4/18; H04N 21/00; H04L 41/00; H04L 67/12; G06F 16/00
See application file for complete search history.

(56) References Cited

U.S. PATENT DOCUMENTS

2015/0062344 A1* 3/2015 Sano .................. H04N 5/772 348/159
2018/0158323 A1* 6/2018 Takenaka .............. H04N 5/77

FOREIGN PATENT DOCUMENTS

JP 2017-182757 10/2017
JP 2018010406 1/2018

* cited by examiner

*Primary Examiner* — Nader Bolourchi
(74) *Attorney, Agent, or Firm* — Fujitsu Patent Center

(57) ABSTRACT

A method for data collection includes: executing a specification process for identifying a first apparatus from among a plurality of first apparatuses; executing a requesting process that includes transmitting a request to the identified first apparatus; executing a recording process for recording, in a storage, a first identifier of the identified first apparatus when a second apparatus does not receive a response from the identified first apparatus within a predetermined time after transmitting the request; executing a decision process for deciding, in response to an access from any of the plurality of first apparatuses, whether an identifier of the any of the plurality of first apparatuses matches the first identifier stored in the storage; and executing, when the identifier matches the first identifier stored in the storage, a re-requesting process for re-requesting data to the any of the plurality of first apparatuses.

12 Claims, 11 Drawing Sheets

FIG. 6A

| TERMINAL ID: Y2352 | | | | | |
|---|---|---|---|---|---|
| DATA ID | START TIME (YEAR, MONTH, DATE, HOUR, MINUTE, SECOND) | END TIME (YEAR, MONTH, DATE, HOUR, MINUTE, SECOND) | POSITION HISTORY (1-SECOND CYCLE) | SPEED HISTORY (1-SECOND CYCLE) | ... | ENTITY FILE NAME (UNIT OF MINUTE) | ... |
| ... | ... | ... | ... | ... | ... | ... | ... |
| 1710010081 | 2017.10.01 / 07:30:00 | 2017.10.01 / 07:31:00 | (N35.125483,E135.369541), (N35.125483,E135.369541),... | (0.0),(0.0),... | ... | 20171001 0730.mp4 | ... |
| 1710010082 | 2017.10.01 / 07:31:00 | 2017.10.01 / 07:32:00 | (N35.125504,E135.372129), (N35.125505,E135.372225),... | (32.0),(32.0),... | ... | 20171001 0731.mp4 | ... |
| ... | ... | ... | ... | ... | ... | ... | ... |
| 1710010124 | 2017.10.01 / 08:12:00 | 2017.10.01 / 08:13:00 | (N35.126558,E135.498971), (N35.126467,E135.498970),... | (36.6),(36.6),... | ... | 20171001 0812.mp4 | ... |
| 1710010125 | 2017.10.01 / 08:13:00 | 2017.10.01 / 08:14:00 | (N35.123551,E135.498934), (N35.123447,E135.498933),... | (42.1),(42.1),... | ... | 20171001 0813.mp4 | ... |
| 1710010126 | 2017.10.01 / 08:14:00 | 2017.10.01 / 08:15:00 | (N35.120546,E135.498897), (N35.120456,E135.498896),... | (36.2),(36.2),... | ... | 20171001 0814.mp4 | ... |
| 1710010127 | 2017.10.01 / 08:15:00 | 2017.10.01 / 08:15:35 | (N35.118552,E135.498872), (N35.118514,E135.498872),... | (15.2),(15.2),... | ... | 20171001 0815.mp4 | ... |
| 1710010128 | 2017.10.01 / 08:25:00 | 2017.10.01 / 08:26:00 | (N35.118552,E135.498871), (N35.118514,E135.498870),... | (0.0),(0.0),... | ... | 20071001 0825.mp4 | ... |
| 1710010129 | 2017.10.01 / 08:26:00 | 2017.10.01 / 08:27:00 | (N35.118501,E135.498886), (N35.118501,E135.498899),... | (12.0),(11.5),... | ... | 20171001 0826.mp4 | ... |
| ... | ... | ... | ... | ... | ... | ... | ... |

FIG. 6B

TERMINAL ID: Y2352

| DATA ID | START TIME (YEAR, MONTH, DATE, HOUR, MINUTE, SECOND) | END TIME (YEAR, MONTH, DATE, HOUR, MINUTE, SECOND) | POSITION HISTORY (1-SECOND CYCLE) | ... | SPEED HISTORY (1-SECOND CYCLE) | ... | ENTITY FILE NAME (UNIT OF MINUTE) | ... |
|---|---|---|---|---|---|---|---|---|
| ... | ... | ... | ... | ... | ... | ... | ... | ... |
| 1710010138 | 2017.10.01 / 18:31:00 | 2017.10.01 / 18:32:00 | (N35.118501,E135.498886), (N35.118501,E135.498899)... | ... | (0.0),(0.0),... | ... | 201710011831.mp4 | ... |
| 1710010139 | 2017.10.01 / 18:45:00 | 2017.10.01 / 18:46:00 | (N35.118501,E135.498886), (N35.118501,E135.498899)... | ... | (0.0),(0.0),... | ... | 201710011845.mp4 | ... |
| 1710010140 | 2017.10.01 / 18:46:00 | 2017.10.01 / 18:47:00 | (N35.118501,E135.498952), (N35.118501,E135.498951)... | ... | (45.0),(45.0),... | ... | 201710011846.mp4 | ... |
| ... | ... | ... | ... | ... | ... | ... | ... | ... |
| 1710010176 | ... | ... | ... | ... | ... | ... | ... | ... |
| 1710010177 | ... | ... | ... | ... | ... | ... | ... | ... |

FIG. 7

| TERMINAL ID | DATA ID | START TIME (YEAR, MONTH, DATE, HOUR, MINUTE, SECOND) | END TIME (YEAR, MONTH, DATE, HOUR, MINUTE, SECOND) | POSITION HISTORY (1-SECOND CYCLE) | ENTITY FILE NAME |
|---|---|---|---|---|---|
| M5987 | 1711050369 | 2017.11.05 / 12:30:00 | 2017.11.01 / 08:13:00 | (N35.120489,E135.499832),(N35.120489,E135.499692)... | 201711051230.mp4 |
| V6589 | 1711060687 | 2017.11.06 / 21:30:33 | 2017.11.06 / 21:31:33 | (N35.120469,E135.499788),(N35.120469,E135.499801)... | 201711062130.mp4 |
| V6589 | 1711060688 | 2017.11.06 / 21:31:36 | 2017.11.06 / 21:32:36 | (N35.120335,E135.499789),(N35.120335,E135.499787)... | 201711062131.mp4 |
| X1247 | 1711180106 | 2017.11.18 / 14:31:06 | 2017.11.18 / 14:32:06 | (N35.120648,E135.499716),(N35.125483,E135.499736)... | 201711181431.mp4 |
| Y2352 | 1710010126 | 2017.10.01 / 08:14:00 | 2017.10.01 / 08:15:00 | (N35.120546,E135.498897),(N35.120456,E135.498896)... | 201710010814.mp4 |
| Z0236 | 1712250056 | 2017.12.25 / 07:56:47 | 2017.12.25 / 07:57:47 | (N35.120583,E135.499869),(N35.120583,E135.499866)... | 201712250756.mp4 |
| Z0236 | 1712250087 | 2017.12.25 / 19:05:26 | 2017.12.25 / 19:06:26 | (N35.120483,E135.490654),(N35.120483,E135.490654)... | 201712251905.mp4 |
| Z0236 | 1801050184 | 2018.01.05 / 07:52:12 | 2018.01.05 / 07:53:12 | (N35.120548,E135.499843),(N35.120548,E135.498526)... | 201801050752.mp4 |
| Z0236 | 1801050216 | 2018.01.05 / 19:15:24 | 2018.01.05 / 19:16:24 | (N35.120485,E135.490678),(N35.120485,E135.490636)... | 201801051915.mp4 |

FIG. 8

| TERMINAL ID | DATA ID |
|---|---|
| X1247 | 1711180106 |
| Y2352 | 1710010126 |
| Z0236 | 1712250056 |
| Z0236 | 1712250087 |
| Z0236 | 1801050184 |
| Z0236 | 1801050216 |

METHOD, APPARATUS, AND SYSTEM FOR DATA COLLECTION

CROSS-REFERENCE TO RELATED APPLICATION

This application is based upon and claims the benefit of priority of the prior Japanese Patent Application No. 2018-91664, filed on May 10, 2018, the entire contents of which are incorporated herein by reference.

FIELD

The embodiment discussed herein relates to a method, an apparatus, and a system for data collection.

BACKGROUND

An on-vehicle terminal having a communication function uploads data representative of a state or the like of the vehicle to a center server on the real time basis or periodically. To upload, upon such uploading, also data having a large data size like image data picked up by a camera incorporated in the vehicle to the center server at a timing same as that of the other data is not efficient from the point of view of the network load, consumption of the storage capacity of the center server and so forth.

Examples of the related art include Japanese Laid-open Patent Publication No. 2018-10406 and Japanese Laid-open Patent Publication No. 2017-182757.

SUMMARY

According to an aspect of the embodiment, a method for data collection performed by a computer includes: executing a specification process that includes identifying a first apparatus from among a plurality of first apparatuses; executing a requesting process that includes transmitting a request to the identified first apparatus; executing a recording process that includes recording, in a storage, a first identifier of the identified first apparatus when a second apparatus does not receive a response from the identified first apparatus within a predetermined time after transmitting the request; executing a decision process that includes deciding, in response to an access from any of the plurality of first apparatuses, whether an identifier of the any of the plurality of first apparatuses matches the first identifier stored in the storage; and executing, when the identifier matches the first identifier stored in the storage, a re-requesting process for re-requesting data to the any of the plurality of first apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A and 6B illustrate an example of a configuration of a metadata storage unit;

FIG. 7 illustrates an example of a search result list;

FIG. 8 illustrates an example of a configuration of a re-request list; and

DESCRIPTION OF EMBODIMENT

Thus, it is conceivable not to determine data having a large data size like image data as a target of uploading from an on-vehicle terminal. In this case, it is conceivable to acquire, for example, only when required (for example, when such an event as an accident occurs), such data from on-vehicle terminals (hereinafter referred to as "target terminals") of some vehicles (for example, vehicles considered to be traveling at the accident site at the time of the accident). However, the timing at which the center server issues a request for transmission of image data to target vehicles may be later than the time of occurrence of the event such as an accident, and at the timing, all target terminals may not necessarily be ready for communication. This is because there is the possibility that some vehicle in which a target terminal is incorporated may already be in an ignition OFF or inoperative state.

In order to collect a number of data as great as possible, it is conceivable for the center server to perform polling of a transmission request for data after every fixed interval to on-vehicle terminals that do not respond to the transmission request.

However, if the fixed interval is excessively short, the polling to a large number of target terminals imposes a heavy load to the network and the center server. On the other hand, if the fixed interval is elongated, there is the possibility that, within a period of the fixed interval, recording of new data may be started on a vehicle in which a target terminal is incorporated and data in the past may be overwritten in order to save the storage capacity. This gives rise to a problem that the acquisition probability of data may be deteriorated by erasure of the required data.

Therefore, the present technology contemplates enhancement of the acquisition probability of data from on-vehicle terminals.

Figure 1:
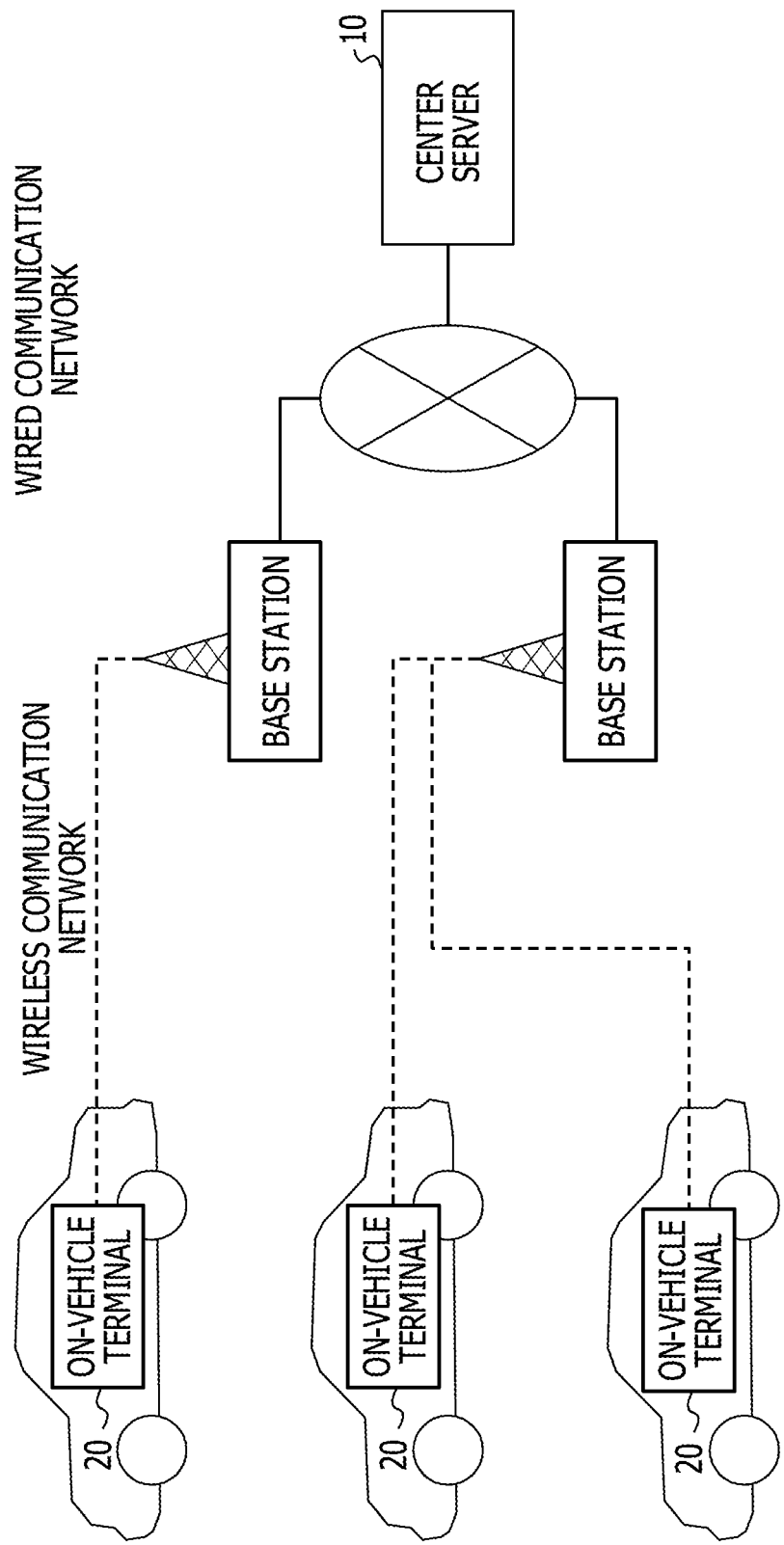
FIG. 1 illustrates an example of a system configuration of an embodiment of the present disclosure.

In the following, an embodiment is described with reference to the drawings. FIG. 1 is a view depicting an example of a system configuration according to the embodiment. Referring to FIG. 1, a plurality of on-vehicle terminals 20 individually incorporated in vehicles and a center server 10 may communicate with each other through a wireless communication network such as a mobile communication network that is terminated at a plurality of base stations or a wired communication network such as the Internet.

Each on-vehicle terminal 20 is an information processing apparatus having a function (communication function) for recording data relating to a state of the vehicle, an environment and so forth and uploading the recorded data to the center server 10.

The center server 10 is one or more computers (information processing apparatus) that accumulate data updated from the on-vehicle terminals 20 and provide services utilizing the data.

Figure 2:
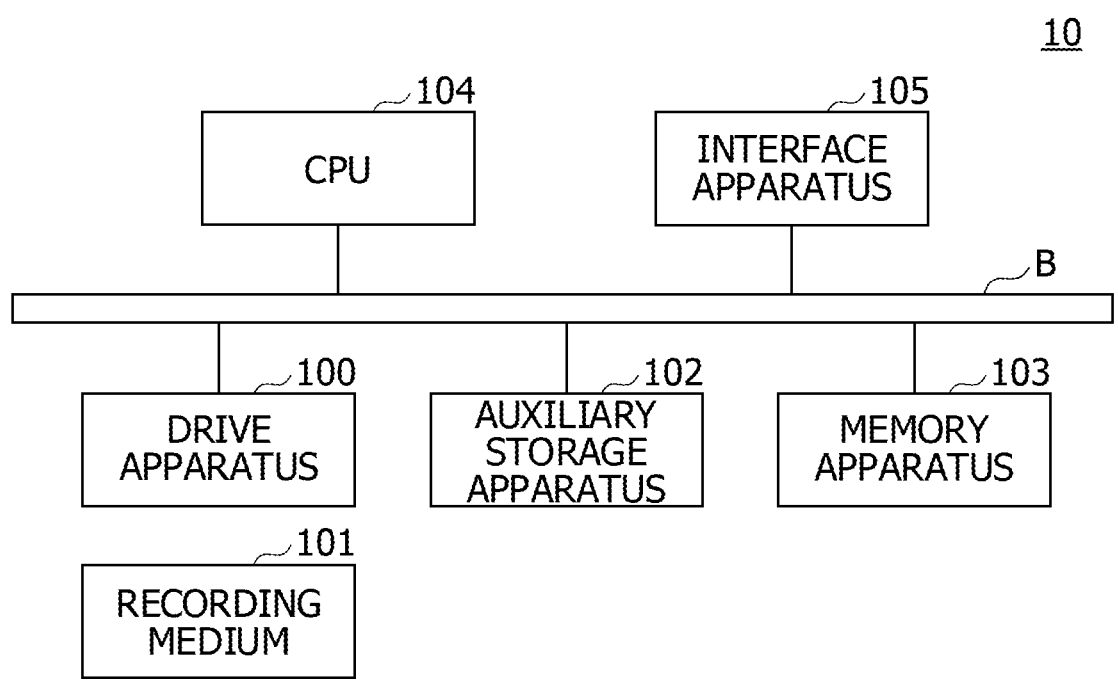
FIG. 2 illustrates an example of a hardware configuration of a center server in the embodiment.

FIG. 2 is a view depicting an example of a hardware configuration of a center server in the embodiment. The center server 10 of FIG. 2 includes a drive apparatus 100, an auxiliary storage apparatus 102, a memory apparatus 103, a central processing unit (CPU) 104, an interface apparatus 105 and so forth that are coupled to each other by a bus B.

A program for implementing processes of the center server 10 is provided by a recording medium 101. If the recording medium 101 in which the program is recorded is set to the drive apparatus 100, the program is installed from the recording medium 101 into the auxiliary storage apparatus 102 through the drive apparatus 100. However, the installation of the program may not necessarily be performed using the recording medium 101, but the program may otherwise be downloaded from a different computer through the network. The auxiliary storage apparatus 102 stores the installed program and stores required files, data and so forth.

In the case where the memory apparatus 103 receives an activation instruction of a program, the memory apparatus 103 reads out and stores the program from the auxiliary storage apparatus 102. The CPU 104 executes functions relating to the center server 10 in accordance with the program stored in the memory apparatus 103. The interface apparatus 105 is used as an interface for coupling to the network.

It is to be noted that, as an example of the recording medium 101, there is a portable recording medium such as a compact disc read-only memory (CD-ROM), a digital versatile disc (DVD) disk, or a universal serial bus (USB) memory. Meanwhile, as an example of the auxiliary storage apparatus 102, there are a hard disk drive (HDD), a flash memory and so forth. Both the recording medium 101 and the auxiliary storage apparatus 102 correspond to a computer-readable recording medium.

Figure 3:
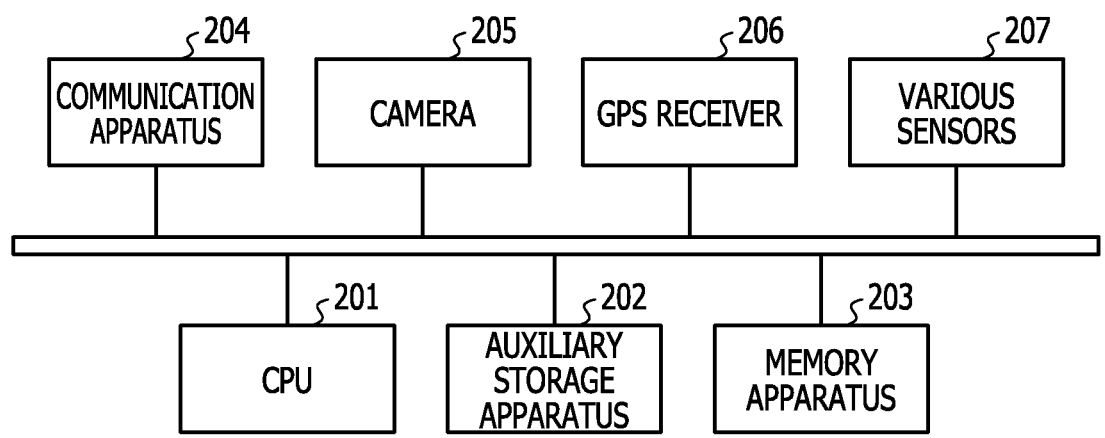
FIG. 3 illustrates an example of a hardware configuration of an on-vehicle terminal in the embodiment.

FIG. 3 is a view depicting an example of a hardware configuration of an on-vehicle terminal in the embodiment. The on-vehicle terminal 20 of FIG. 3 includes a CPU 201, an auxiliary storage apparatus 202, a memory apparatus 203, a communication apparatus 204, a camera 205, a global positioning system (GPS) receiver 206, various sensors 207 and so forth.

A program for implementing processes of the on-vehicle terminal 20 is installed into the auxiliary storage apparatus 202. In the case where an activation instruction of a program is received, the memory apparatus 203 reads out the program from the auxiliary storage apparatus 202 and stores the program. The CPU 201 implements functions relating to the on-vehicle terminal 20 in accordance with the program stored in the memory apparatus 203. The communication apparatus 204 is an apparatus that performs control for coupling to the network by wireless communication. The camera 205 is, for example, a digital camera and picks up an image around the vehicle or in a given direction. The GPS receiver 206 receives GPS signals transmitted from GPS satellites and measures the current position of the vehicle based on the GPS signals. The sensors 207 are one or more sensors for detecting a state of the vehicle, a situation of the environment of the vehicle and so forth such as an inertial measurement unit (IMU) sensor.

It is to be noted that, while FIG. 3 exemplifies an example in which the on-vehicle terminal 20 includes the camera 205, the camera 205 may be mounted outside the on-vehicle terminal 20.

Figure 4:
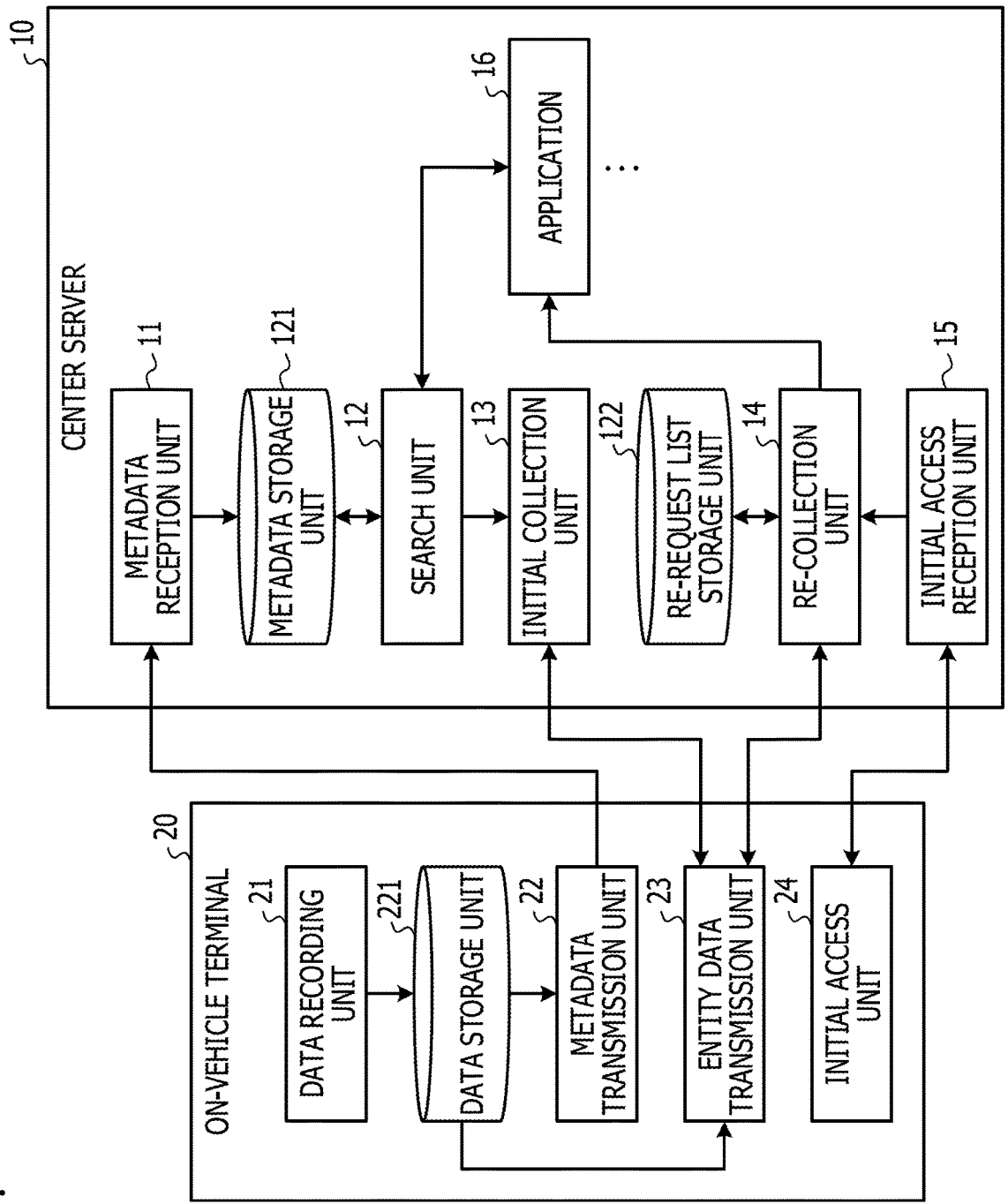
FIG. 4 illustrates an example of a functional configuration of a center server and an on-vehicle terminal in the embodiment.

FIG. 4 is a view depicting an example of a functional configuration of a center server and an on-vehicle terminal in the embodiment. Referring to FIG. 4, the on-vehicle terminal 20 includes a data recording unit 21, a metadata transmission unit 22, an entity data transmission unit 23, an initial access unit 24 and so forth. The components mentioned are implemented by processes executed by the CPU 201 in accordance with one or more programs installed in the on-vehicle terminal 20. The on-vehicle terminal 20 utilizes a data storage unit 221. The data storage unit 221 may be implemented using, for example, the auxiliary storage apparatus 202 or the like.

When the vehicle is operative (for example, in a state of the vehicle in which the ignition is ON), the data recording unit 21 records image data (moving picture or still picture) picked up by the camera 205, position data measured by the GPS receiver 206, various sensor data detected by the various sensors 207 and so forth continually (for example, periodically) into the data storage unit 221. The recording timing may differ for each type of data.

In the present embodiment, data recorded by the data recording unit 21 are roughly divided into entity data and metadata. The entity data is data that is not made a target of continual (for example, periodical after every one minute) transmission (upload) to the center server 10. In order to reduce the load on the network or the load on the center server 10, data having a relative large size may be made the entity data. In the present embodiment, image data picked up by the camera 205 is an example of the entity data.

On the other hand, the metadata is data that is made a target of continual (for example, periodical) transmission to the center server 10. In the present embodiment, data including position data, various sensor data and so forth are examples of the metadata.

The metadata transmission unit 22 continually (for example, periodically) transmits metadata that has not been transmitted (for example, metadata having been recorded into the data storage unit 221 in the last cycle) from among the metadata stored in the data storage unit 221 to the center server 10.

The entity data transmission unit 23 transmits, in response to a transmission request for entity data from the center server 10, the entity data designated in the transmission request to the center server 10.

Upon activation (after activation) of the on-vehicle terminal 20, the initial access unit 24 transmits an access for the notification of the activation of the on-vehicle terminal 20 to the center server 10. The notification of the activation of the on-vehicle terminal 20 is hereinafter referred to as "wakeup signal." It is to be noted that the on-vehicle terminal 20 is activated, for example, in response to ignition ON of the vehicle and stops in response to ignition OFF of the vehicle.

The center server 10 includes a metadata reception unit 11, a search unit 12, an initial collection unit 13, a re-collection unit 14, an initial access reception unit 15, one or more applications 16 and so forth. The components mentioned are implemented by processes executed by the CPU 104 in accordance with one or more programs installed in the center server 10. The center server 10 further uses a metadata storage unit 121, a re-request list storage unit 122 and so forth. The storage units mentioned may be implemented using, for example, the auxiliary storage apparatus 102 or a storage apparatus or the like that may be coupled to the center server 10 through the network.

The respective applications 16 are software for providing a unique service for each of the applications 16 using data accumulated in the center server 10. For example, a certain application 16 may collect image data around a site of an accident when it receives a notification of occurrence of the accident. Another application 16 may collect data relating to a specific vehicle. It is to be noted that part or all of the applications 16 may be deployed in a computer coupled to the center server 10 through a network.

The metadata reception unit 11 receives metadata transmitted from on-vehicle terminals 20 and stores the metadata into the metadata storage unit 121.

The search unit 12 operates in response to a search request from an application 16 to search a set of metadata stored in the metadata storage unit 121 for metadata that satisfy a condition (hereinafter referred to as "search condition") designated in the search request.

The initial collection unit 13 collects entity data corresponding to each metadata that matches with a search condition from on-vehicle terminals 20 of transmission sources of the metadata. For example, the initial collection unit 13 transmits, for each of the metadata that match with the search condition, a transmission request for entity data corresponding to the metadata to each of the on-vehicle terminals 20 that are transmission sources of the metadata. The initial collection unit 13 registers an identifier of each on-vehicle terminal 20 that dos not respond to the transmission request (such identifier is hereinafter referred to as "terminal ID") and an identifier corresponding to entity data to be acquired from the on-vehicle terminal 20 (such identifier is hereinafter referred to as "data ID") into a re-request list. The re-request list is a list of on-vehicle terminals 20 from which entity data is not acquired successfully and data identifiers (IDs) corresponding to the entity data and is stored into the re-request list storage unit 122. It is to be noted that entity data corresponding to metadata is entity data whose recording timing is same as that of the metadata.

The initial access reception unit 15 receives a wakeup signal. The wakeup signal includes a terminal ID of an on-vehicle terminal 20 of a transmission source of the wakeup signal.

The re-collection unit 14 decides in response to reception of a wakeup signal by the initial access reception unit 15 whether or not the terminal ID included in the wakeup signal is registered in the re-request list. In the case where the re-collection unit 14 decides that the terminal ID is registered in the re-request list, it transmits a transmission request for entity data again to the on-vehicle terminal 20 having the terminal ID to acquire the entity data from the on-vehicle terminal 20.

Figure 5A:
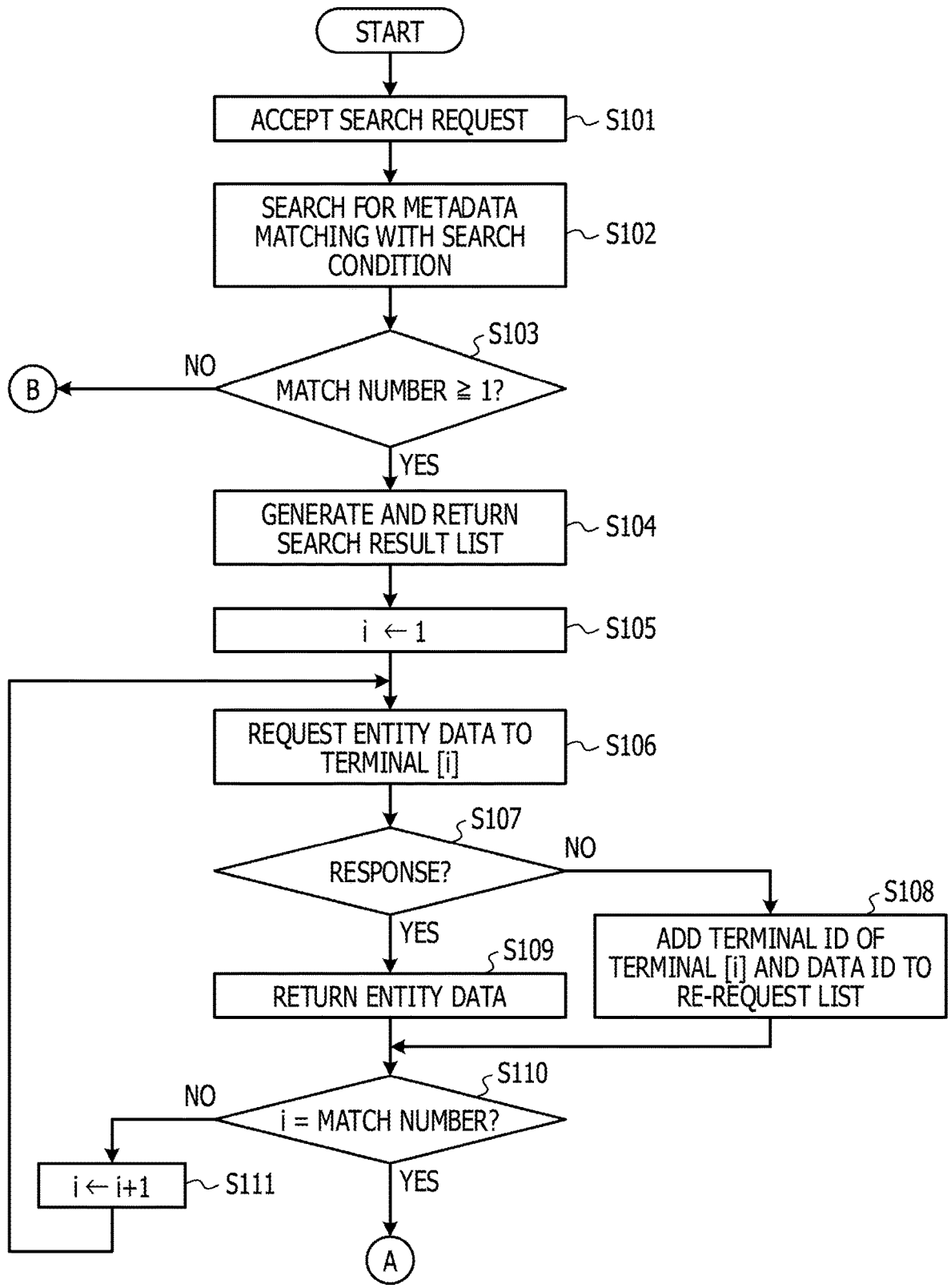
FIGS. 5A and 5B illustrate an example of a processing procedure executed by a center server.
Figure 5B:
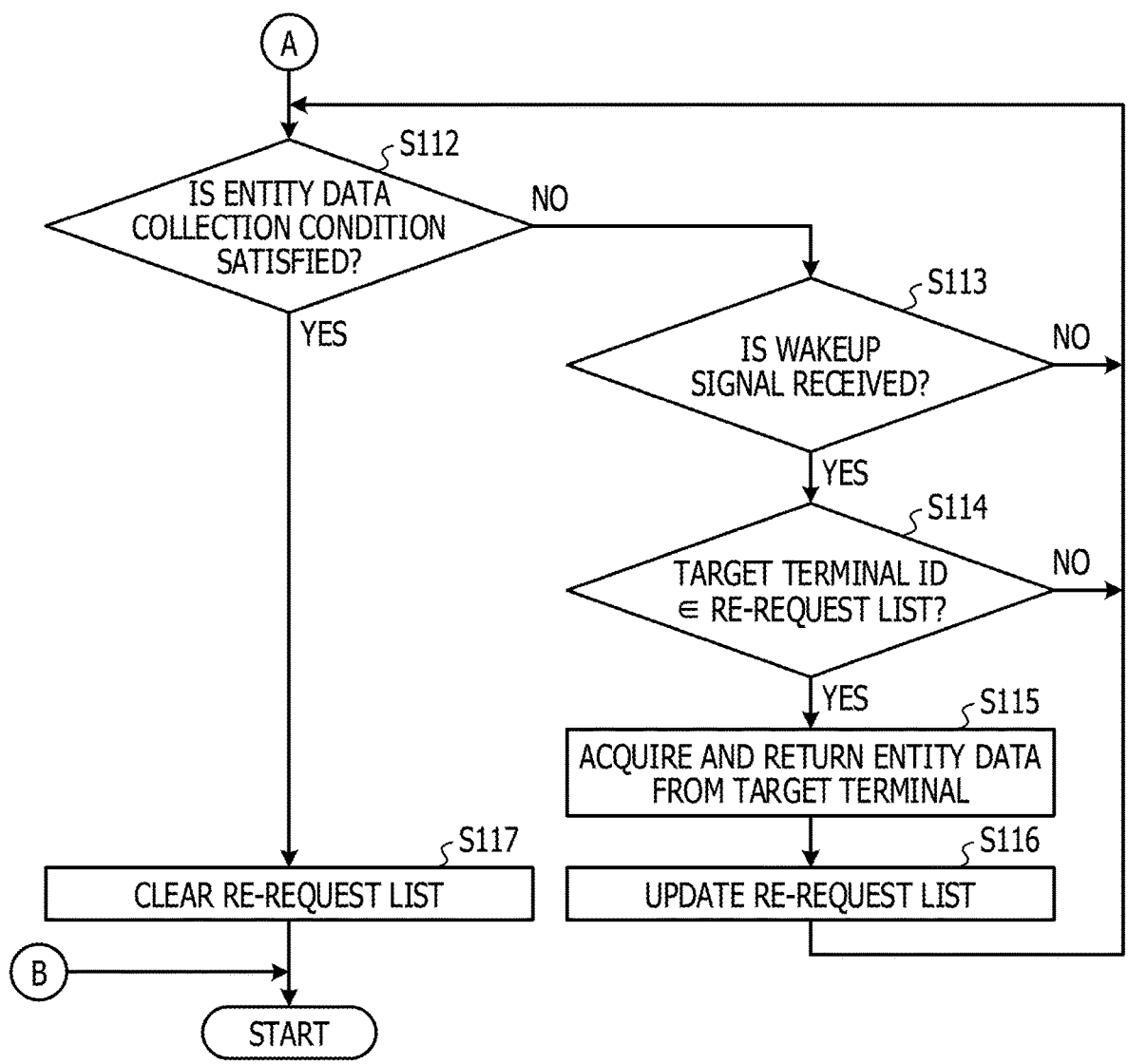

In the following, a processing procedure executed by the center server 10 or an on-vehicle terminal 20 is described. FIG. 5 (i.e., FIGS. 5A and 58) is a flow chart illustrating an example of a processing procedure executed by a center server. It is to be noted that it is assumed that, at the time of starting of the processing procedure of FIG. 5, metadata transmitted (uploaded) from on-vehicle terminals 20 are accumulated in the metadata storage unit 121.

If a search request from some application 16 is accepted (Yes at S101), the search unit 12 searches the metadata storage unit 121 for metadata that matches with a search condition designated by the search request (S102).

FIG. 6 (i.e., FIGS. 6A and 6B) is a view depicting an example of a configuration of a metadata storage unit. As depicted in FIG. 6, a metadata list L1 is stored in the metadata storage unit 121 for each on-vehicle terminal 20. To one metadata list L1, a terminal ID of the on-vehicle terminal 20 corresponding to the metadata list L1 is attached. In FIG. 6, a metadata list L1 that is a set of metadata to which "Y2352" is attached as the terminal ID is depicted.

Metadata that configure the metadata list L1 includes a data ID, start time, end time, a position history, a speed history, an entity file name and so forth. The data ID is an identifier for a set of metadata and entity data corresponding to the metadata. The start time is start time (year, month, date, hour, minute, second) of recording (or generation) of each data configuring the metadata and the entity data. The end time is end time (year, month, date, hour, minute, second) of recording (or generation) of each data configuring the metadata and the entity data. In the present embodiment, it is assumed that the generation cycle of one metadata and entity data (hereinafter referred to as "data generation cycle") is one minute. For example, each on-vehicle terminal 20 generates metadata and entity data in a unit of one minute and transmits the metadata to the center server 10 after every one minute. Accordingly, the end time of each metadata is time after one minute from the start time of the metadata. The position history is a history of position information (latitude and longitude) of the vehicle in a cycle of one second within the data generation cycle. The speed history is a history of the speed of the vehicle in a cycle of one second within the data generation cycle. The entity file name is a file name of a file into which the entity data recorded in the data generation cycle are stored.

As the search condition, various conditions may be designated if they are conditions for metadata. Timing conditions such as time, a period (time zone) or the like, a spot (specific position), a geographical range (area or the like), a geographic condition such as a specific route on roads or the like, a condition for limiting a specific on-vehicle terminal 20, a combination of such conditions and so forth may be listed as examples of the search condition. For example, in the case where an application 16 requires entity data (image data) around a site of an event such as a certain accident, crime or the like, it is anticipated that a combination (AND condition) of a timing condition indicative of time or a period around the time of occurrence of the event and a geographical condition indicative of an area including the site is estimated as the search condition.

In the case where the number of metadata that match with the search condition (number of matches) is 0 (No at S103), the processing procedure of FIG. 5 ends. In the case where the number of matches is 1 or more (Yes at S103), the search unit 12 generates a search result list that is a list of metadata that match with the search condition, and returns the search result list to the application 16 of the source of the search request and inputs the search result list to the initial collection unit 13 (S104).

FIG. 7 is a view depicting an example of a search result list. As depicted in FIG. 7, each record of the search result list includes a terminal ID, a data ID and so forth of each metadata that matches with the search condition. The items other than the terminal ID and the data ID may be changed in accordance with data items that may be designated by a search condition and are required by the application 16. In FIG. 7, an example in which a position history and an entity file name are such data items. In this manner, a given on-vehicle terminal 20 that matches with the search condition is specified based on the search result list. Each record of the search result list is hereinafter referred to as "search result data" for the convenience of description.

Then, the initial collection unit 13 substitutes 1 into a variable i (S105). The variable i is a variable for identifying the ith search result data (hereinafter referred to as search result data [i]) in the search result list. Then, the initial collection unit 13 transmits a transmission request for entity data to the on-vehicle terminal 20 having the terminal ID included in the search result data [i] (hereinafter referred to as "terminal [i]") (for example, requests entity data to the on-vehicle terminal 20) (S106). The transmission request includes a designation of the data ID included in the search result data [i].

In the case where a response from the terminal [i] to the transmission request is not received (No at S107), the initial collection unit 13 registers the set of the terminal ID and the data ID of the search result data [i] into the re-request list stored in the re-request list storage unit 122 (S108).

FIG. 8 is a view depicting an example of a configuration of a re-request list. As depicted in FIG. 8, into the re-request list, a data ID is registered in an associated relationship with a terminal ID. It is to be noted that there is the possibility also that a plurality of metadata uploaded from one on-vehicle terminal 20 may match with the search condition. For example, in the example of FIG. 8, four data IDs are registered for the terminal ID "Z0236." Although, in the flow chart of FIG. 5, a procedure is depicted in which entity data may be requested one by one to such an on-vehicle terminal 20 as just described, the plurality of entity data may be requested collectively to the on-vehicle terminal 20. In this case, at step S111 to be described later, it is sufficient if the variable i is incremented by the number equal to the number of the plural entity data.

It is to be noted that, as a case of an example of a cause when a response from the terminal [i] is not received, there is a case in which the terminal [i] is not in a communicatable condition with the center server 10 (for example, a case in which the terminal [i] is outside a communication area or another case in which the vehicle in which the terminal [i] is incorporated is in an ignition OFF condition).

On the other hand, in the case where a response from the terminal [i] is received (Yes at S107), the initial collection unit 13 acquires the entity data included in the response and returns the entity data to the application 16 of the source of the search request (S109). It is to be noted that a first response from the terminal [i] may not include entity data but include information indicating that transmission of the entity data is possible. In this case, at step S109, the initial collection unit 13 may acquire entity data relating to the data ID of the search result data [i] again from the terminal [i] and return the entity data to the application 16 of the source of the search request.

Then, the initial collection unit 13 decides whether or not the value of the variable i reaches the number of matches (S110). For example, it is decided whether or not a request for transmission of entity data is issued to the on-vehicle terminal 20 relating to all search result data included in the search result list. If the value of the variable i is lower than the number of matches (No at S110), the initial collection unit 13 increments the variable i by one (S111) and then repeats the processes beginning with step S106.

On the other hand, in the case where the value of the variable i reaches the number of matches (Yes at S110), the re-collection unit 14 decides whether or not a collection condition for entity data is satisfied (S112). The collection condition for entity data may be designated, for example, by a ratio (for example, 70% or the like) of the number of acquired entity data to the number of search result data included in the search result list (for example, the number of matches). In this case, in the case where the ratio becomes equal to or higher than a ratio designated as the collection condition, it is decided that the collection condition is satisfied. It is to be noted that the ratio may be calculated by "(number of search result data included in search list— number of data IDs included in re-request list)/number of search result data included in search list." As an alternative, the collection condition may be designated by a quantity of entity data acquired successfully. In this case, in the case where the number of acquired entity data becomes equal to or greater than the quantity designated by the collection condition, the collection condition is satisfied. As another alternative, the collection condition may be designated by an elapsed time period after the search request. In this case, at the point of time at which the elapsed time period elapses, the collection condition is satisfied. It is to be noted that the collection condition for entity data may be designated together with a search request from the application 16 of the source of the search request or may be stored fixedly in the auxiliary storage apparatus 102 or the like in advance.

In the case where the collection condition for entity data is not satisfied (No at S112), the re-collection unit 14 waits for reception of a wakeup signal by the initial access reception unit 15 (S113). If the initial access reception unit 15 receives a wakeup signal from any of the on-vehicle terminals 20 (Yes at S113), the re-collection unit 14 decides whether or not a terminal ID included in the wakeup signal (hereinafter referred to as "target terminal ID") is included in the re-request list (FIG. 8) (S114).

In the case where the target terminal ID is not included in the re-request list (No at S114), the processing returns to step S112. In the case where the target terminal ID is included in the re-request data (Yes at S114), the re-collection unit 14 transmits a transmission request for entity data relating to the data ID stored in an associated relationship with the target terminal ID in the re-request list to the on-vehicle terminal 20 having the target terminal ID and returns entity data included in a response to the transmission request to the application 16 of the source of the search request (S115). Along with this, in the case where a plurality of IDs are associated with the target terminal ID in the re-request list, a plurality entity data relating to the plurality of data IDs may be acquired at a time.

Then, the re-collection unit 14 updates the re-request list (FIG. 8) (S116). For example, the re-collection unit 14 deletes the set of the target terminal ID and the data ID of the acquired entity data from the re-request list. Thereafter, the processing returns to step S112.

If the collection condition for entity data is satisfied (Yes at S112), the re-collection unit 14 clears the re-request list stored in the re-request list storage unit 122 (deletes the terminal IDs and the data IDs registered in the re-request list) (S117), and then the processing procedure of FIG. 5 is ended.

Figure 9:
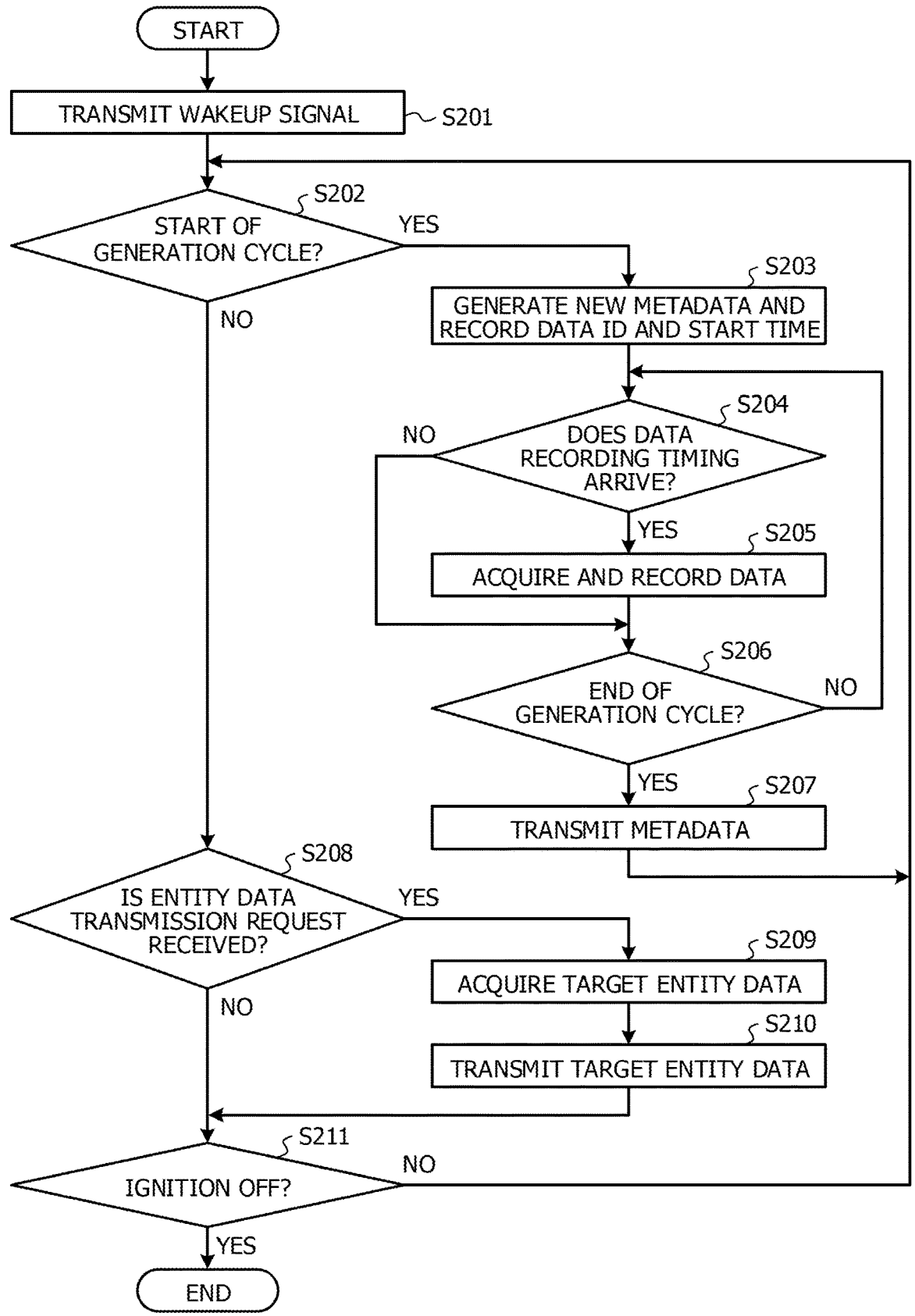
FIG. 9 illustrates an example of a processing procedure executed by an on-vehicle terminal.

Now, a processing procedure executed by an on-vehicle terminal 20 is described. FIG. 9 is a flow chart illustrating an example of a processing procedure executed by an on-vehicle terminal.

If an on-vehicle terminal 20 (hereinafter referred to as "target terminal") is activated in response to turning ON of the ignition of the vehicle or the like, the initial access transmission unit transmits a wakeup signal including the terminal ID of the target terminal to the center server 10 (S201). It is to be noted that the terminal ID is stored, for example, in the auxiliary storage apparatus 202 or the like. Further, transmission of a wakeup signal may be executed also when the on-vehicle terminal 20 returns into the communication area.

Then, when the start timing of a data generation cycle comes (Yes at S202), the data recording unit 21 generates a new record of metadata (hereinafter referred to as "target record"), records the data ID of the target record and the current time into the items for "data ID" and "start time" of the target record and stores the target record into the data storage unit 221 (S203). It is to be noted that the configuration of the target record may be similar to that, for example, of one metadata depicted in FIG. 6. Further, in the case where the data storage unit 221 does not have a free space, the data recording unit 21 deletes a record corresponding to the oldest data collection cycle from among the records stored for the individual data generation cycles in the data storage unit 221 and stores the newly generated record into the data storage unit 221.

Then, the data recording unit 21 waits for the arrival of a timing for recording of data configuring metadata or entity data (hereinafter referred to as "data recording timing") (S204). For example, in the example of FIG. 6, the recording cycle of position data or a speed is one second. For example, FIG. 6 depicts an example in which the data recording timing comes after every one second. However, the recording timing may differ among different data types. For example, if image data to be picked up by the camera 205 are a moving picture, the image data may be recorded continuously.

If a data recording timing arrives (Yes at S204), the data recording unit 21 acquires data of an acquisition target from the camera 205, the GPS receiver 206, the various sensors 207 and so forth and records the acquired data into the target record (S205). For example, position data, a speed or the like at the current point of time is recorded into the target record.

Thereafter, when end time of the data generation cycle arrives (Yes at S206), the metadata transmission unit 22 transmits the metadata stored in the target record to the center server 10 (S208). For example, if the data generation cycle is one minute, the end time of the data generation cycle arrives after one minute from the start time of the data generation cycle. It is to be noted that, in the case where entity data are stored into a different file for each data generation cycle like movie data, the data recording unit 21 may generate an entity file in which the movie data picked up in the data generation cycle are stored and store the entity file into the data storage unit 221 at a timing at which the end time of the data generation cycle arrives. In this case, the file name of the entity file is recorded into "entity file name" of the target record.

On the other hand, if a transmission request for the entity data is received from the center server 10 (Yes at S208), the entity data transmission unit 23 acquires entity data from the entity file having the entity file name corresponding to the data ID included in the transmission request (S209). Then, the entity data transmission unit 23 transmits the entity data to the center server 10 (S210).

The processes at steps S201 to S210 are continually performed until the ignition of the vehicle is turned OFF (S211).

As described above, according to the present embodiment, for entity data in whose acquisition the initial collection unit 13 fails, the terminal ID or the like of an on-vehicle terminal 20 that retains the entity data is recorded into the re-request list. Thereafter, a re-request for the entity data is issued to the on-vehicle terminal 20 taking reception of a wakeup signal transmitted to the center server 10 immediately after activation of the on-vehicle terminal 20 or a like timing as a trigger. Accordingly, a re-request may be issued at a timing as quick as possible after communication with the on-vehicle terminal 20 becomes possible. As a result, the acquisition probability of data (entity data) from the on-vehicle terminals 20 may be enhanced.

It is to be noted that, while it is described in the foregoing description that a wakeup signal is an example of a trigger for re-requesting, a different access from the on-vehicle terminal 20 such as that upon first uploading of metadata after failure in acquisition of entity data (after request for entity data) by the initial collection unit 13, or upon first uploading of probe information or the like may be used as a trigger for re-request. In this case, preferably the access is an access within a given period (for example, at the beginning) after failure in acquisition of entity data by the initial collection unit 13 from the point of view of conservation of the entity data of the acquisition target.

It is to be noted that, in the present embodiment, entity data is an example of data. The re-request list storage unit 122 is an example of a storage unit. The center server 10 is an example of a computer and a data collection apparatus. The initial collection unit 13 is an example of a storage processor. The re-collection unit 14 is an example of a decision unit and a re-requesting unit. The plurality of on-vehicle terminals 20 and the center server 10 are an example of a data collection system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for data collection performed by a computer, the method comprising:
    executing a specification process that includes identifying a first apparatus from among a plurality of first apparatuses;
    executing a requesting process that includes transmitting a request to the identified first apparatus;
    executing a recording process that includes storing, in a storage, a first identifier of the identified first apparatus when a second apparatus does not receive a response from the identified first apparatus within a predetermined time after transmitting the request;
    executing a decision process that includes deciding, in response to an access from any of the plurality of first apparatuses, whether an identifier of the any of the plurality of first apparatuses matches the first identifier stored in the storage; and
    executing, when the identifier matches the first identifier stored in the storage, a re-requesting process for re-requesting data to the any of the plurality of first apparatuses.

2. The method according to claim 1,
    wherein the access is a first access after transmitting the request from the first apparatus that does not respond to the request.

3. The method according to claim 1,
    wherein the access is a first access to the computer after activation of the first apparatus.

4. The method according to claim 1,
    wherein the plurality of first apparatuses includes a plurality of on-vehicle terminals, each of the plurality of on-vehicle terminals being configured to be associated with a vehicle.

5. An apparatus for data collection, the apparatus comprising:
    a memory; and a processor coupled to the memory, the processor being configured to execute a specification process that includes identifying a first apparatus from among a plurality of first apparatuses, execute a requesting process that includes transmitting a request to the identified first apparatus, execute a recording process that includes storing, in a storage, a first identifier of the identified first apparatus when a second apparatus does not receive a response from the identified first apparatus within a predetermined time after transmitting the request, execute a decision process that includes deciding, in response to an access from any of the plurality of first apparatuses, whether an identifier of the any of the plurality of first apparatuses matches the first identifier stored in the storage, and execute, when the identifier matches the first identifier stored in the storage, a re-requesting process for re-requesting data to the any of the plurality of first apparatuses.

6. The apparatus according to claim 5,
wherein the access is a first access after transmitting the request from the first apparatus that does not respond to the request.

7. The apparatus according to claim 5,
wherein the access is a first access to the computer after activation of the first apparatus.

8. The apparatus according to claim 5,
wherein the plurality of first apparatuses includes a plurality of on-vehicle terminals, each of the plurality of on-vehicle terminals being configured to be associated with a vehicle.

9. A system for data collection, the system comprising:
a plurality of first apparatuses; and
a second apparatus being configured to identify a first apparatus from among a plurality of first apparatuses, and send a request to the identified first apparatus;

wherein the second apparatus is further configured to execute a recording process that includes storing, in a storage, a first identifier of the identified first apparatus when a second apparatus does not receive a response from the identified first apparatus within a predetermined time after sending the request, execute a decision process that includes deciding, in response to an access from any of the plurality of first apparatuses, whether an identifier of the any of the plurality of first apparatuses matches the first identifier stored in the storage, and execute, when the identifier matches the first identifier stored in the storage, a re-requesting process for re-requesting data to the any of the plurality of first apparatuses.

10. The system according to claim 9,
wherein the access is a first access after the request for data from the identified first apparatus that does not respond to the request within the predetermined time.

11. The system according to claim 9,
wherein the access is a first access to the computer after activation of the first apparatus.

12. The system according to claim 9,
wherein the plurality of first apparatuses includes a plurality of on-vehicle terminals, each of the plurality of on-vehicle terminals being configured to be associated with a vehicle.

\* \* \* \* \*